United States Patent

[11] 3,610,657

| [72] | Inventor | Edward N. Cole<br>Bloomfield Hills, Mich. |
|---|---|---|
| [21] | Appl. No. | 11,189 |
| [22] | Filed | Feb. 13, 1970 |
| [45] | Patented | Oct. 5, 1971 |
| [73] | Assignee | General Motors Corporation<br>Detroit, Mich. |

[54] VEHICLE OCCUPANT RESTRAINT SYSTEM
3 Claims, 2 Drawing Figs.

| [52] | U.S. Cl. | 280/150 AB |
|---|---|---|
| [51] | Int. Cl. | B60r 21/10 |
| [50] | Field of Search | 280/150<br>AB, 150 B; 244/121, 122 |

[56] References Cited
UNITED STATES PATENTS

| 2,418,798 | 4/1947 | Whitmer | 244/121 |
|---|---|---|---|
| 2,834,606 | 5/1958 | Bertrand | 280/150 |
| 3,414,292 | 12/1968 | Oldberg et al. | 280/150 |
| 3,473,824 | 10/1969 | Carey et al. | 280/150 |
| 3,476,402 | 11/1969 | Wilfert | 280/150 |
| 3,510,150 | 5/1970 | Wilfert | 280/150 |

FOREIGN PATENTS

| 953,312 | 3/1964 | Great Britain | 280/150 |
|---|---|---|---|

Primary Examiner—Kenneth H. Betts
Attorneys—W. E. Finken, A. M. Heiter and R. L. Phillips ABSTRACT: A vehicle occupant restraint system having a plurality of bags which are inflated on vehicle impact with a stationary or moving object. One of the bags receives the impact of the occupant's torso and on such impact, has controlled pressure relief to prevent excessive rebounding of the occupant. Another bag, that is located within the first-mentioned bag, receives the impact of the occupant's legs and remains inflated on such impact to maintain the occupant in the normal seated position. Fluid delivery to pressurize both bags is delivered by a manifold which is continuously open to the outer bag and is connected by a one-way valve to the inner bag.

PATENTED OCT 5 1971

3,610,657

INVENTORS
Edward N. Cole
BY
Ronald L. Phillips
ATTORNEY

VEHICLE OCCUPANT RESTRAINT SYSTEM

This invention relates to vehicular occupant restraint system and more particularly to multiple bag restraint systems for restraining vehicle occupants on vehicle impact with a stationary or moving object.

In a vehicle having a single bag or cushion that is inflated on vehicle impact with a stationary or moving object, an occupant may rebound excessively off the inflated bag on impact therewith and may also become dislodged from the passenger seat if he is not otherwise restrained by a seat belt. When multiple bag systems are used to prevent such excessive rebound and also to prevent occupant dislodgement, it has been found desirable that pressure be supplied to all of the bags in a very efficient manner and that the cushioning arrangement be of compartmental construction.

The vehicle occupant restraint system according to the present invention comprises an inner bag located within an outer bag with both bags being inflated on vehicle impact with a stationary or moving object. On inflation, the outer bag expands to receive the impact of the occupant's torso and then on such impact, has controlled pressure relief to cushion the occupant while acting to prevent excessive rebound of the occupant's torso. The inner bag expands to receive impact of the occupant's legs and remains inflated on such impact and acts to maintain the occupant in the normal seated position. Fluid delivery for inflation of both bags is provided by a manifold that extends into the outer bag and has ports which open to the interior of this bag. A one-way valve is mounted on the manifold in the interior of the outer bag and is operable to open the interior of the manifold to the interior of the inner bag and to prevent fluid flow in the opposite direction.

An object of the present invention is to provide an inflatable occupant restraint system that has an outer bag for preventing excessive rebounding of the occupant and another bag within the outer bag that maintains the occupant in the normal seated position.

Another object is to provide a multiple bag vehicle occupant restraint system in which an inner bag is located within an outer bag with the outer bag on inflation acting to cushion the impact of the occupant and prevent excessive rebounding thereof, and the inner bag on inflation operating to maintain the occupant in the normal seated position.

Another object is to provide in a vehicle an occupant restraint system that operates to simultaneously inflate an outer bag and an inner bag located within the outer bag with the outer bag on inflation operating to receive impact of the occupant+s torso and to prevent excessive rebound thereof through pressure relief while the inner bag remains inflated on impact by the occupant's legs and acts to retain the occupant on the seat.

These and other objects of the present invention will be more apparent from the following description and drawing in which.

Figure 1:
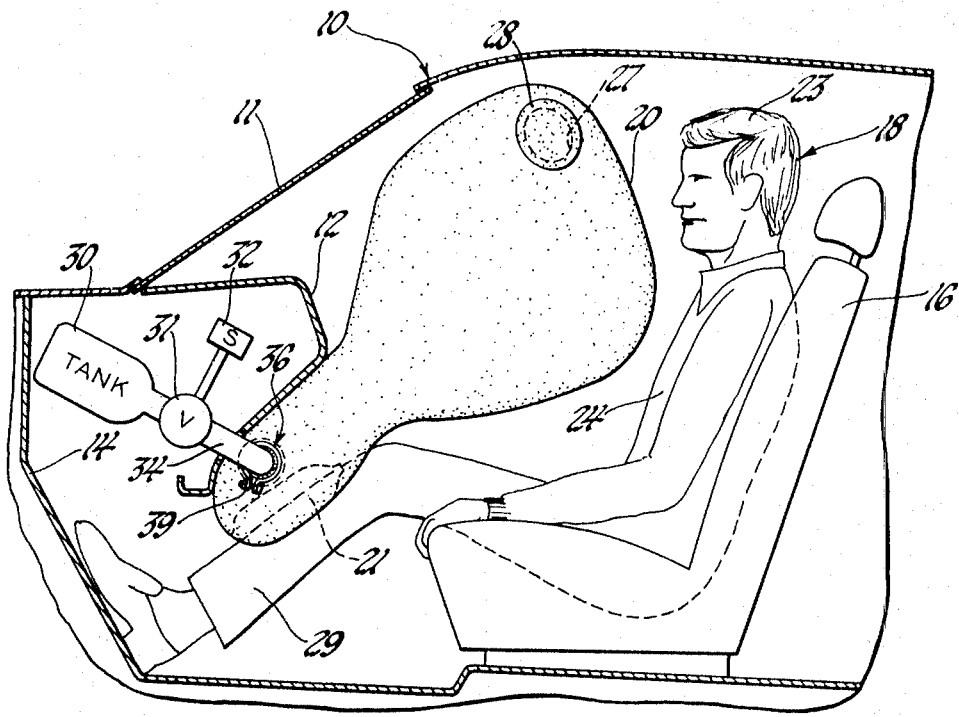
FIG. 1 is side elevation with parts broken away of a vehicle having an occupant restraint system according to the present invention.

Referring to FIG. 1, there is shown a vehicle 10 having a windshield 11, an instrument panel 12, a toe board 14 and a seat 16 in which a vehicle occupant 18 sits.

The occupant restraint system according to the present invention comprises a pair of inflatable bags 20 and 21, the bag 21 being located within bag 20 and both bags being normally stowed in a collapsed, folded position on the lower edge of the instrument panel 12. The bags 20 and 21, when inflated with fluid pressure, expand to the positions shown. The outer bag 20 is conditioned when inflated to receive the impact of the occupant's head 23 and torso 24 to prevent contact of the occupant's head and torso with the windshield 11 and instrument panel 12. An orifice 27 in the outer bag 20 is normally closed by a patch 28 which is releasably sealingly secured to the exterior of this bag. The inner bag 21, which may also be called a knee bag, is conditioned when inflated to receive the impact of the occupant's legs 29 through outer bag 20 below the knees and prevent contact of the legs with the instrument panel 12.

The fluid for inflating both the inner bag 21 and outer bag 20 is normally stored under pressure in a pressure vessel or tank 30. Fluid pressure delivery for bag inflation is controlled by valve 31 which is normally closed and is opened by a sensing device 32 that senses impact of the vehicle with a stationary or moving object. Both the valve 31 and the sensing device 32 may be of any appropriate type. When valve 31 is opened on vehicle impact, the fluid under pressure in tank 30 is delivered through a pipe 34 to a manifold 36 that is connected to deliver fluid simultaneously to both bags 20 and 21.

Figure 2:
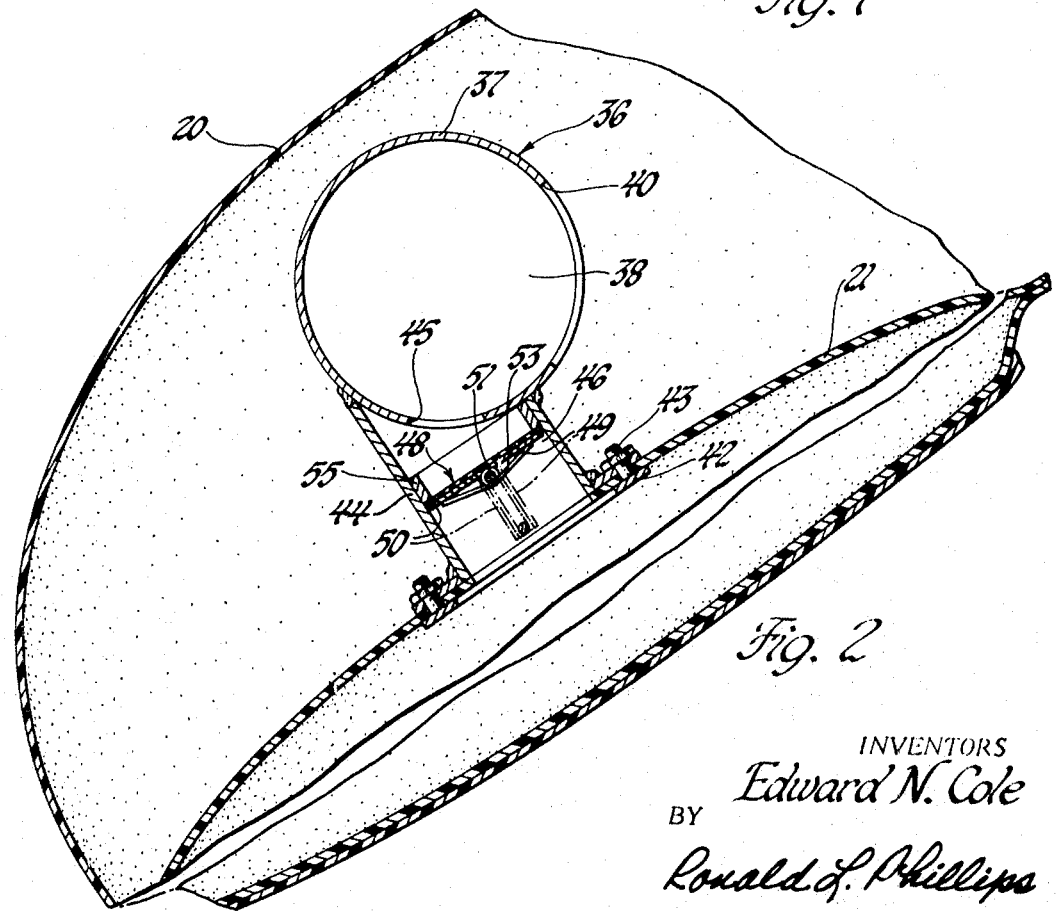
FIG. 2 is an enlarged cross-sectional view of the manifold shown in FIG. 1.

The manifold 36 is mounted adjacent the lower edge of instrument panel 12 and as best shown in FIG. 2 comprises a cylinder 37 that forms a chamber 38 that is closed at one end and is open at the other end to pipe 34. The manifold 36 extends through opposite walls of the outer bag 20 and the outer bag is sealingly clamped to the surface of the manifold at these penetrations by clamps 39, one of which is shown in FIG. 1. That portion of the manifold 36 sealed within the outer bag 20 is provided with axially spaced slots 40 that open the manifold chamber 38 to the interior of the outer bag.

The throat of the inner knee bag 21 is sealingly clamped along its lip by a clamp 42 and bolts 43 to a sleeve 44 that supports the inner bag 21 on manifold 36 and also provides for connecting the manifold chamber 39 to the interior of this bag. This fluid connection is through an axially extending slot 45 in cylinder 37 and the interior 46 of sleeve 44. Thus, the connection between the manifold chamber 38 and the inner knee bag 21 is separate from the manifold connection to the outer bag 20. A one-way valve 48 mounted in sleeve 44 permits fluid to travel from the manifold chamber 39 to fill inner knee bag 21 and prevents flow in the opposite direction. The valve 48 comprises a pair of flapper valve elements 49 and 50 that are pivoted on a pin 51. A torsion spring 53 provides a small biasing force to normally hold the valve elements 49 and 50 in the closed position shown where they contact a valve seat 55 to close the passage between manifold chamber 38 and inner knee bag 21. When fluid pressure is supplied to manifold chamber 38, the valve members 40 and 50 are moved by this pressure against the bias of spring 53 to provide communication between the manifold chamber 39 and the inner knee bag 21.

Describing now the operation of the restraint system, the valve 31 is normally closed with the bags 20 and 21 deflated and stored in a folded position along the dash 12. Then when the vehicle impacts a stationary or moving object, the sensing device 32 operates to effect opening of valve 31 to provide fluid delivery from tank 30 to the manifold 36. The manifold 36 distributes the fluid directly to the outer bag 20 and the inner knee bag 21, the one-way valve 48 opening to permit delivery to knee bag 21. On impact of the occupant's torso and head with the thus inflated outer bag 20, the pressure therein is increased sufficiently by this impact to blow off patch 28 so that there is then provided controlled pressure relief through orifice 27 to the atmosphere. This results in controlled pressure relief of the bag 20 at the impact of the occupant with this bag continues with the bag then collapsing about the occupant's torso to provide a very soft cushion therefor and to prevent excessive rebound thereof.

On inflation of the knee bag 21, the one-way valve 49 opens to permit such inflation. Then on the occupant's legs impacting knee bag 21, which impact is transmitted through the outer bag 20, the one-way valve 48 closes to maintain the pressure in knee bag 21 while the outer bag 20 is being relieved of pressure through orifice 27. This inflation of the knee bag 21 is maintained to restrain the occupant in seat 16 by preventing him from slipping downward and towards the front of the vehicle.

The above embodiment is illustrative of the present invention which may be modified within the scope of the appended claims.

I claim:

1. In a vehicle occupant restraint system the combination of first inflatable bag means that on inflation by fluid pressure assumes a position to receive impact of a vehicle occupant's torso; second inflatable bag means that is located within said first inflatable bag means and that on inflation by fluid pressure assumes a position to receive impact of the occupant's legs through said first inflatable bag means to maintain the occupant in a seated position; fluid delivery means for delivering fluid under pressure simultaneously to said first and second inflatable bag means; said first inflatable bag means including pressure relief means for relieving pressure in said first inflatable bag means when said first inflatable bag means is impacted by the occupant's torso; and said fluid delivery means including one-way valve means for delivering the fluid under pressure to said second inflatable bag means and maintaining the pressure in said second inflatable bag means while pressure is being relieved from said first inflatable bag means.

2. The vehicle occupant restraint system set forth in claim 1 and said fluid delivery means comprising a manifold extending into said first inflatable bag means; first fluid delivery port means in said manifold open to the interior of said first inflatable bag means; second fluid delivery port means in said manifold; said one-way valve means mounted on said manifold interior of said first inflatable bag means and being operable to open said second fluid delivery port means to the interior of said second inflatable bag means for the fluid delivery to said second inflatable bag means and being operable to prevent fluid delivery from said second inflatable bag means to said manifold for the pressure maintenance in said second inflatable bag means.

3. A vehicle body occupant restraint system comprising, in combination, a source of pressure fluid, first inflatable cushion means engageable by the torso of a vehicle body occupant, second inflatable cushion means contained within the first cushion means and engageable therethrough by the legs of a vehicle body occupant, means communicating the first and second cushion means with the pressure fluid source for inflation thereof, means communicating the first cushion means with the atmosphere upon the pressure therein exceeding a predetermined level, and means maintaining the pressure fluid within the second cushion means upon inflation thereof.

PO-1050
(5/69)

UNITED STATES PATENT OFFICE
CERTIFICATE OF CORRECTION

Patent No. 3,610,657     Dated October 5, 1971

Inventor(s) Edward N. Cole

It is certified that error appears in the above-identified patent and that said Letters Patent are hereby corrected as shown below:

Column 1, line 3, "system" should read -- systems --.
         line 46, "occupant+s" should read -- occupant's --.

Column 2, line 27, the numeral "39" should read -- 38 --.
         line 33, the numeral "39" should read -- 38 --.
         line 41, the numeral "40" should read -- 49 --.
         line 43, the numeral "39" should read -- 38 --.
         line 58, "at" should read -- as --.
         line 62, the numeral "49" should read -- 48 --.

Signed and sealed this 18th day of April 1972.

(SEAL)
Attest:

EDWARD M. FLETCHER, JR.          ROBERT GOTTSCHALK
Attesting Officer                Commissioner of Patents